United States Patent
Terem (10) Patent No.: US 12,192,571 B2
(45) Date of Patent: Jan. 7, 2025

(54) VIDEO PLAYBACK BASED ON AN HTML IFRAME AND A HEADLESS BROWSER

(71) Applicant: Synamedia Limited, Staines Upon Thames (GB)

(72) Inventor: Amotz Terem, Jerusalem (IL)

(73) Assignee: Synamedia Limited, Maidenhead (GB)

(*) Notice: Subject to any disclaimer, the term of this patent is extended or adjusted under 35 U.S.C. 154(b) by 191 days.

(21) Appl. No.: 17/947,722

(22) Filed: Sep. 19, 2022

(65) Prior Publication Data

US 2024/0098333 A1 Mar. 21, 2024

(51) Int. Cl.
| | |
|---|---|
| *H04N 13/00* | (2018.01) |
| *G06F 16/958* | (2019.01) |
| *H04N 21/432* | (2011.01) |
| *H04N 21/44* | (2011.01) |
| *H04N 21/81* | (2011.01) |

(52) U.S. Cl.
CPC .......... *H04N 21/44* (2013.01); *G06F 16/958* (2019.01); *H04N 21/4325* (2013.01)

(58) Field of Classification Search
CPC ............... H04N 21/44; H04N 21/4325; H04N 21/8586; G06F 16/958
See application file for complete search history.

(56) References Cited

U.S. PATENT DOCUMENTS

| 9,674,247 | B1* | 6/2017 | Ward | H04N 21/47217 |
| 11,461,430 | B1* | 10/2022 | Kristoffersen | G06F 16/951 |
| 2006/0277588 | A1* | 12/2006 | Harrington | G11B 27/034 |
| | | | | 725/135 |
| 2013/0074131 | A1* | 3/2013 | Cerveau | H04N 21/4431 |
| | | | | 725/112 |
| 2013/0100242 | A1* | 4/2013 | Canitz | H04N 21/4143 |
| | | | | 348/E7.003 |
| 2018/0146263 | A1* | 5/2018 | Doherty | H04N 21/47217 |
| 2020/0045375 | A1* | 2/2020 | Augustus, III | H04N 21/47217 |
| 2024/0098333 | A1* | 3/2024 | Terem | H04N 21/8586 |

* cited by examiner

*Primary Examiner* — Howard D Brown, Jr.
(74) *Attorney, Agent, or Firm* — Fernando & Partners, LLP (57) ABSTRACT

Various embodiments include facilitating video playback, based on an HTML iframe and a headless browser. To that end, in some embodiments, a method is performed at a first device, which may be referred to as a receiving device. The first device includes a processor, a non-transitory memory, and a communication interface. The communication interface enables commutation with a second device, which may be referred to as a sending device. The method includes receiving the HTML iframe from the second device. The HTML iframe may include a video tag, or the video tag may be nested in another HTML iframe. Moreover, the method includes playing a video stream that is identified by the video tag. Playing the video stream includes executing the HTML iframe via the headless browser to retrieve the video stream based on the video tag, and transmitting the video stream to a display device.

20 Claims, 4 Drawing Sheets

VIDEO PLAYBACK BASED ON AN HTML IFRAME AND A HEADLESS BROWSER

TECHNICAL FIELD

The present disclosure relates to video playback, and in particular, video playback via a remote video player.

BACKGROUND

In certain video playback systems, a playback control device communicates with a video player in order to facilitate playback of a video stream, sometimes referred to as remote video playback. The playback control device and the video player may coordinate video playback via one or more predefined applications. Accordingly, video playback may be constrained by the predefined application(s).

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Various embodiments include facilitating video playback based on a HyperText Markup Language (HTML) inline frame (iframe) and a headless browser. For example, a first device performs video playback, based on a remote playback (e.g., casting) request from a second device. To that end, the first device (e.g., a receiving device) receives the HTML iframe from the second device (e.g., a sending device). The HTML iframe is associated with a video tag, which identifies a video stream for video playback. The first device includes a communication interface to enable communication with the second device, such as a Bluetooth interface or near-field communication (NFC) interface. The first device executes the HTML iframe via a headless browser, in order to retrieve the video stream. For example, in some embodiments, the HTML iframe includes the video tag e.g., a portion of text of the HTML iframe corresponds to the video tag. As another example, in some embodiments, the HTML iframe does not include the video tag, such as when the video tag is nested in the HTML iframe. The headless browser may run JavaScript to execute the HTML iframe, or may run one or more program libraries to execute the HTML iframe. The headless browser runs on a processor of the first device. As compared with other video playback systems, the processor of the first device may be lightweight—e.g., the processor may have lower processing capabilities. Finally, the first device transmits the video stream to a display device. In some embodiments, the first device is physically connectable to the display device, such as when the first device is an adapter (e.g., a dongle). In some embodiments, the first device and the display device are integrated in a common device, such as being integrated in a smart television (TV).

In accordance with some embodiments, a method is performed at a first device including a processor, a non-transitory memory, and a communication interface. The method includes receiving, via the communication interface, an HTML iframe from a second device. The HTML iframe is associated with a video tag. The method includes playing a video stream that is identified by the video tag. Playing the video stream includes executing the HTML iframe via a headless browser in order to retrieve the video stream based on the video tag, and transmitting the video stream to a display device.

In accordance with some embodiments, a first device includes a processor, a non-transitory memory, and a communication interface. The one or more programs are stored in the non-transitory memory and configured to be executed by the processor and the one or more programs include instructions for performing or causing performance of the operations of any of the methods described herein. In accordance with some embodiments, a non-transitory computer readable storage medium has stored therein instructions which when executed by a processor of a network device, cause the network device to perform or cause performance of the operations of any of the methods described herein. In accordance with some embodiments, a network device includes means for performing or causing performance of the operations of any of the methods described herein. In accordance with some embodiments, an information processing apparatus, for use in a network device, includes means for performing or causing performance of the operations of any of the methods described herein.

In certain video playback systems, a playback control device communicates with a video player in order to facilitate playback of a video stream, such as via a remote video player. For example, a user interface (UI) displayed on a smartphone enables a user to select a video stream, and the smartphone transmits corresponding playback information to the video player. The playback control device and the video player may coordinate video playback via one or more predefined applications, such as a predefined receiver application. The predefined application(s) may include a proprietary application program interface (API), such as an application that is customed-defined by a discovery application running on the playback control device. Accordingly, video playback at the video player is constrained by the predefined application(s). For example, the predefined application(s) define a playback control characteristic associated with the video stream (e.g., video size, video resolution, DRM information, ad insertions, etc.), and the video player cannot override the playback control characteristic when playing the video stream.

By contrast, various embodiments described below provide more efficient and flexible video playback techniques.

Example Embodiments

Figure 1:
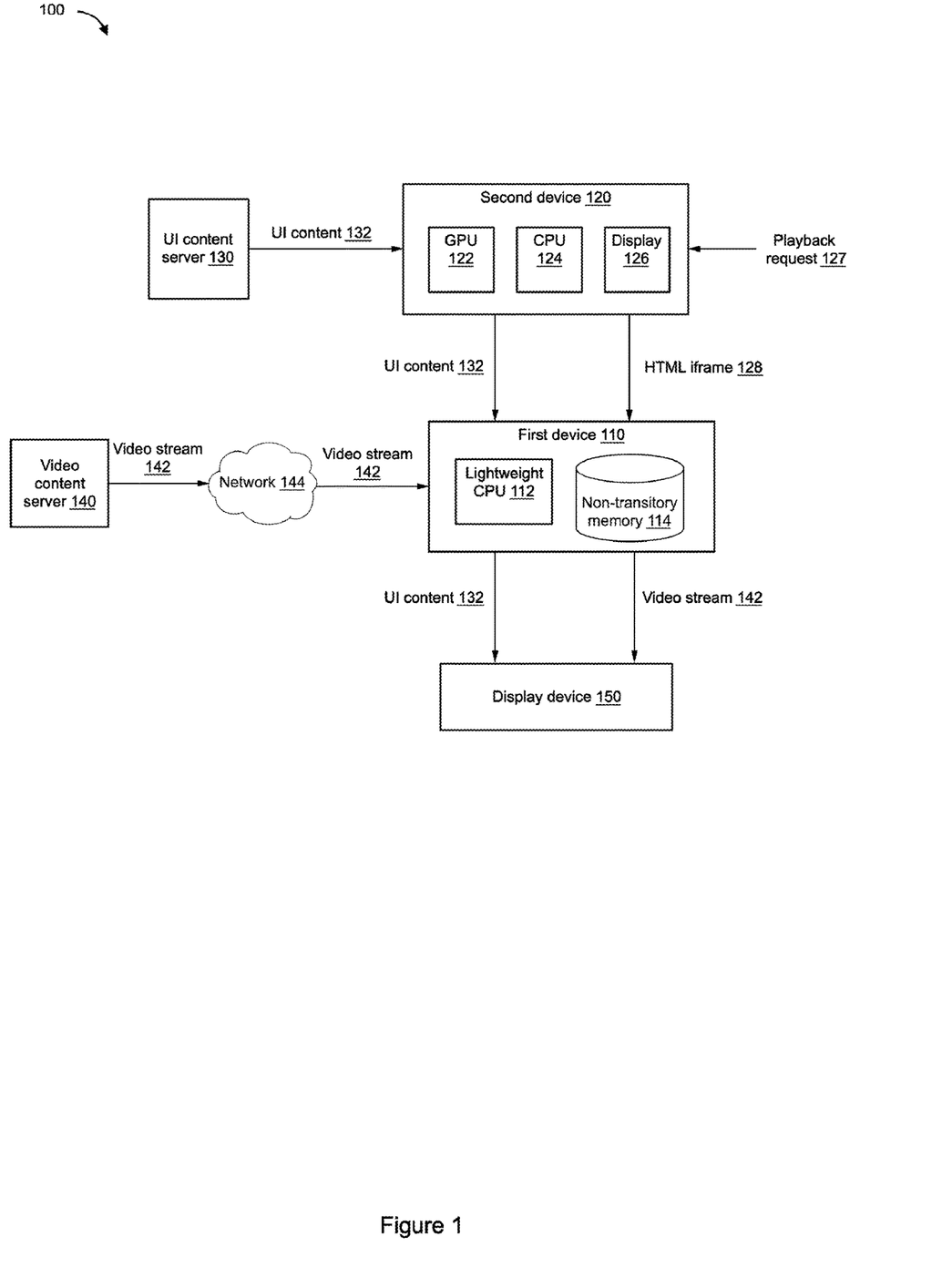
FIG. 1 is an example of a first video playback architecture in accordance with some embodiments.

FIG. 1 is an example of a first video playback architecture 100 in accordance with some embodiments. As illustrated in FIG. 1, the first video playback architecture 100 includes a first device 110, a second device 120, a user interface (UI) content server 130, a video content server 140, and a display device 150.

The first device 110 and the second device 120 coordinate to facilitate video playback of a video stream 142 at the display device 150. In some embodiments, the second device 120 displays, on a display 126, UI content 132 from the UI content server 130. A user of the second device 120 may provide a playback request 127 to the second device 120 in order to initiate remote video playback. For example, the displayed UI content 132 includes a home screen including a ribbon of media objects (e.g., thumbnails of movies and/or television shows), and the user of the second device 120 selects a particular media object. As another example, the displayed UI content 132 includes an initiate remote video playback affordance, and the playback request 127 selects the initiate remote video playback affordance. In response to detecting selection of the initiate remote video playback affordance, the second device 120 initiates a remote video playback operation with respect to a currently selected media object. In some embodiments, the second device 120 corresponds to a mobile device, such as a smartphone, laptop, tablet, etc. In some embodiments, the second device 120 may include a graphics processing unit (GPU) 122 to render the UI content 132 for display on the display 126. In some embodiments, the second device 120 relays the UI content 132 to the first device 110, which, in turn, relays the UI content 132 to the display device 150 for display. Moreover, the second device 120 may include a central processing unit (CPU) 124 to perform various operations (e.g., related to remote video playback).

In some embodiments, in response to receiving the playback request 127, the second device 120 sends an HTML iframe 128 to the first device 110. Accordingly, in the context of remote video playback, such as casting, the first device 110 may be referred to as a receiving device, and the second device 120 may be referred to as a sending device. The HTML iframe 128 is associated with a video tag, which identifies a video stream 142. In some embodiments, the HTML iframe 128 includes the video tag. In some embodiments, the HTML iframe 128 does not include a video tag, such as when the video tag is nested within the HTML iframe 128. For example, the HTML iframe 128 identifies another HTML iframe, which includes the video tag.

In order to play the video stream 142, the first device 110 executes, via a headless browser, the HTML iframe 128 in order to retrieve the video stream 142 based on the video tag. To that end, in some embodiments, the first device 110 includes a lightweight CPU 112 that runs the headless browser. As compared with the CPU 124 of the second device 120, the lightweight CPU 112 may have lower processing capabilities. For example, the lightweight CPU 112 cannot effectively render the UI content 132 or the video stream 142. Executing the HTML, iframe 128 may include the lightweight CPU 112 running JavaScript on the HTML, iframe 128.

In some embodiments, as illustrated in FIG. 1, the first device 110 retrieves the video stream 142 from the video content server 140 via a network 144. The network 144 may correspond to a personal area network (PAN), wired local area network (LAN), wireless local area network (WLAN), wireless wide area networks (WWAN), etc. In some embodiments, the network 144 corresponds to a content delivery network (CDN). In some embodiments, the video content server 140 is located at an Internet Service Provider (ISP) that provides internet service to the first device 110, thereby enabling the video stream 142 to be transmitted to the first device 110 with relatively low latency.

As part of the video playback, the first device 110 transmits the video stream 142 to the display device 150. In some embodiments, the first device 110 includes a non-transitory memory 114, and uses the non-transitory memory 114 to enable more efficient transmission of the video stream 142 to the display device 150. For example, while receiving the video stream 142 from the video content server 140, the first device 110 writes a portion of the video stream 142 to the non-transitory memory 114, and subsequently reads out the portion of the video stream 142 during transmission of the video stream 142.

In some embodiments, the first device 110 is an adapter that plugs into the display device 150, such as a dongle plugging into a TV. Although FIG. 1 illustrates the first device 110 as separate from the display device 150, in some embodiments, the first device 110 and the display device 150 are integrated into a common device, such as a TV. For example, each of the first device 110 and the display device 150 is a respective hardware component of the TV.

Figure 2:
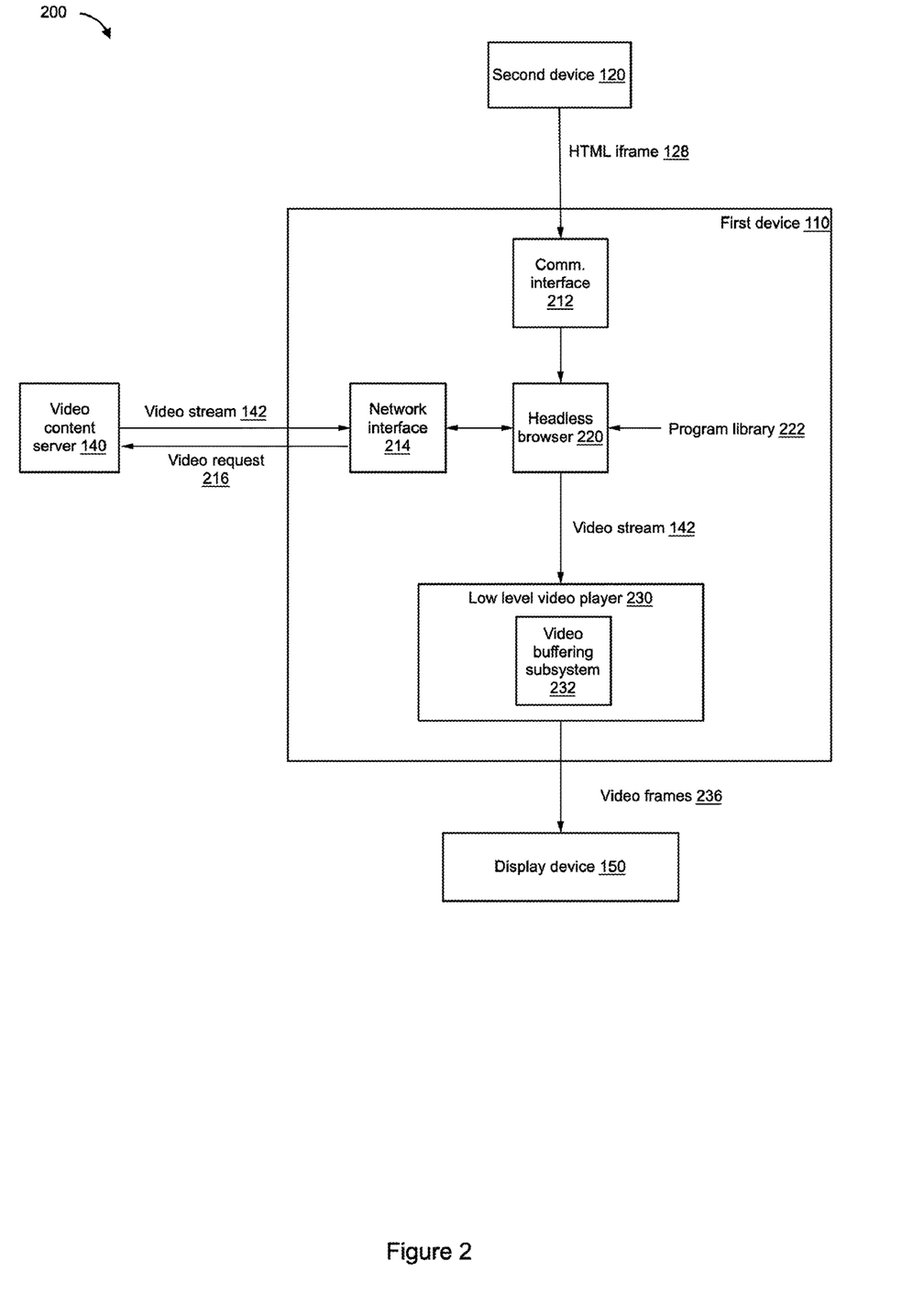
FIG. 2 is an example of a second video playback architecture in accordance with some embodiments.

FIG. 2 is an example of a second video playback architecture 200 in accordance with some embodiments. The second video playback architecture 200 includes the first device 110, the second device 120, the video content server 140, and the display device 150. In some embodiments, the first device 110 of FIG. 2 is similar to and adapted from the first device 110 of FIG. 1. For example, certain components of the first device 110 of FIG. 2 (e.g., headless browser 220) run on the lightweight CPU 112 of the first device 110 of FIG. 1. As another example, certain components of the first device 110 of FIG. 2 (e.g., video buffering subsystem 232) include or utilize the non-transitory memory 114 of the first device 110 of FIG. 1. Certain features of the second video playback architecture 200 are omitted for the sake of clarity and brevity.

As illustrated in FIG. 2, the first device 110 includes a communication interface 212 that enables communication with the second device 120. For example, the communication interface 212 corresponds to a Bluetooth interface, an NFC interface, and/or the like. The first device 110 receives, via the communication interface 212, the HTML iframe 128 from the second device 120.

The first device 110 includes a headless browser 220 that executes the HTML iframe 128 in order to retrieve the video stream 142. For example, executing the HTML iframe 128 includes running JavaScript on the HTML iframe 128. As another example, in some embodiments, the headless browser uses a program library 222 (e.g., a library of a programming language) to aid in executing the HTML iframe 128. In some embodiments, retrieving the video stream 142 includes sending, to the video content server 140, a video request 216. For example, the video request 216 includes the video tag, which enables the video content server 140 to locate the video stream 142 that is identified by the video tag. Accordingly, in some embodiments, in response to receiving the video request 216, the video content server 140 sends the video stream 142 to the first device 110.

In some embodiments, the first device 110 includes a network interface 214 to enable the aforementioned communications with the video content server 140. Examples of the network interface 214 include a Wi-Fi interface, a cellular network interface, etc.

In some embodiments, the first device 110 relays the video stream 142 to the display device 150, such as is described with reference to FIG. 1. In some embodiments, the first device 110 includes a low level video player 230 that prepares the video stream 142 in order to transmit video frames 236 to the display device 150, as illustrated in FIG. 2. For example, the low level video player 230 performs one or more of decoding the video stream 142, demuxing the video stream 142, etc.

For example, the low level video player 230 includes a video buffering subsystem 232. The video buffer subsystem 232 may be allocated in the non-transitory memory 114 of the first device 110. The video buffering subsystem 232 may buffer portions of the video stream 142 from the video content server 140, to enable more efficient transmission of the video stream 142 to the display device 150. More efficient transmission of the video stream 142 may result in smoother display of video at the display device 150. For example, the buffering enables less stalling and lagging related to display of the video stream 142 at the display device 150.

Accordingly, each of the first video playback architecture 100 and the second video playback architecture 200 enables greater playback flexibility than other video playback architectures that use predefined applications to coordinate video playback. For example, whereas a predefined application sets limits regarding ad insertion during video playback, execution of the HTML iframe 128 and transmission of the retrieved video stream 142 is not constrained by the limits regarding ad insertion.

Figure 3:
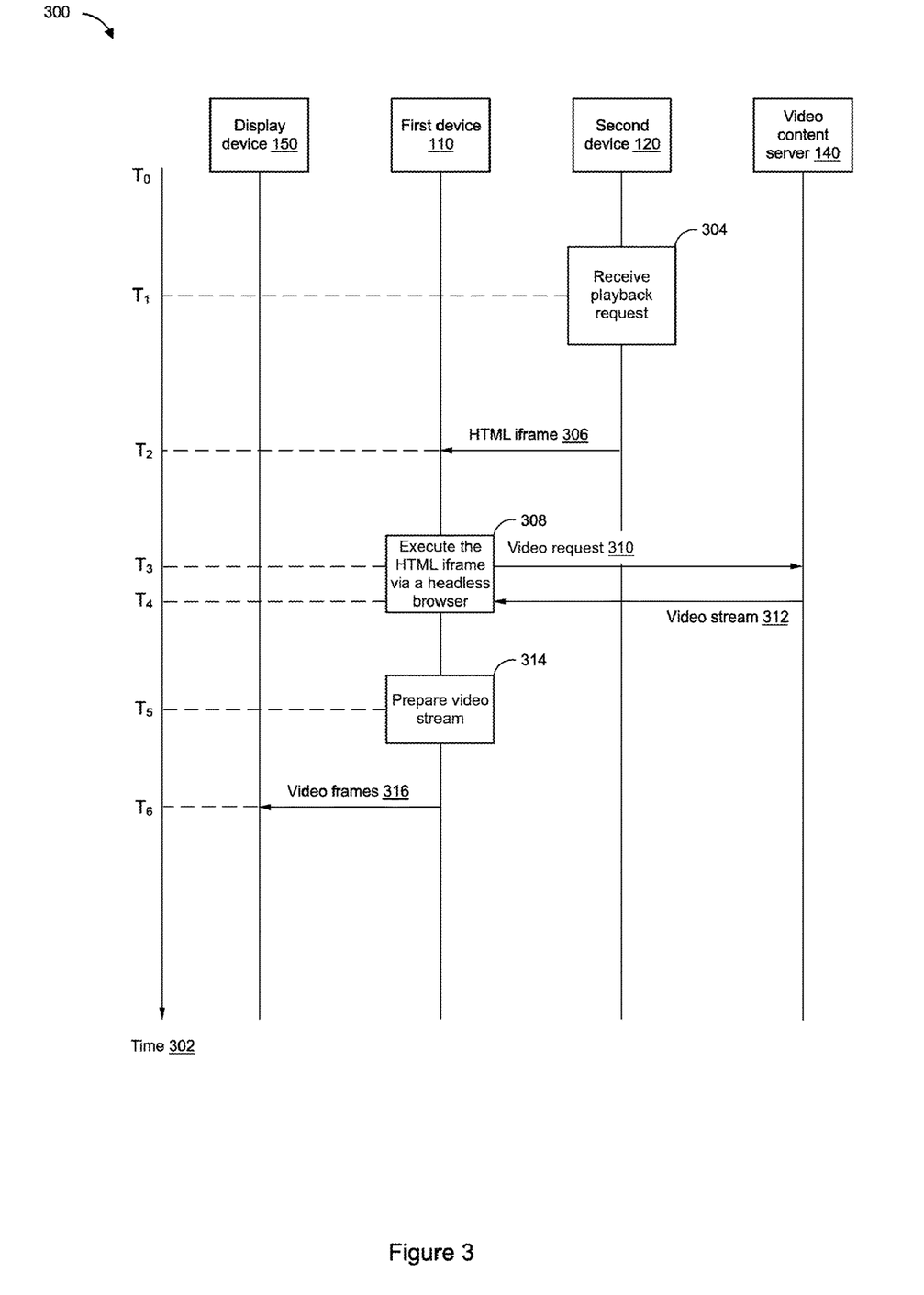
FIG. 3 is a timeline representation of first and second devices coordinating video playback in accordance with some embodiments.

FIG. 3 is a timeline representation 300 of the first device 110 and the second device 120 coordinating video playback in accordance with some embodiments.

As illustrated in FIG. 3, a current time indicator 302 indicates the passage of time, starting at an initial time $T_0$.

At a first time $T_1$, as represented by block 304 and in some embodiments, the second device 120 receives a playback request—e.g., the playback request 127 of FIG. 1. For example, the playback request is provided by a user of the second device 120. As one example, the second device 120 includes a content discovery application to discover accessible content. The accessible content may correspond to content that is currently accessible based on a user profile or credentials of the user, such as a video streaming service for which the user has an active account. The second device 120 may display UI content of the video streaming service, and the user may select, from the UI content, a particular media object (e.g., movie or TV show) for playback. For example, when the second device 120 is a smartphone, a finger of the user selects a particular thumbnail in order to provide the playback request to the second device. In some embodiments, the playback request corresponds to a request to start remote video playback (e.g., start casting). For example, the second device 120 displays a remote video playback affordance within a UI of a video streaming application. Selection of the remote video playback affordance by the user triggers the second device 120 to begin remote video playback. For example, the user has selected a video clip to watch, and the second device 120 accordingly begins to display the video clip. Continuing with this example, while the video clip is being displayed, the user selects the remote video playback affordance, which triggers the second device 120 to begin transmitting the video clip to the display device 150. Transmitting the video clip to another device (the display device 150) may enable the display of the second device 120 to be available for other user applications.

At a second time $T_2$, in some embodiments, in response to receiving the playback request, the second device 120 sends an HTML iframe 306 to the first device 110. For example, the HTML iframe 306 corresponds to the HTML iframe 128 described with reference to FIGS. 1 and 2. The HTML iframe 306 is associated with a video tag, such as a playable uniform resource locator (URL) indicator or HTML address indicator.

The first device 110 plays a video stream 312 that is identified by the video tag. To that end, as represented by block 308, the first device 110 executes the HTML iframe 306 via a headless browser in order to retrieve the video stream 312 based on the video tag. To that end, in some embodiments, at a third time $T_3$ the first device 110 sends a video request 310 to the video content server 140 in order to retrieve the video stream 312. The video request 310 may include the video tag. In response to sending the video request 310, the first device 310 receives the video stream 312 from the video content server 140 at a fourth time T4. The video stream 312 may be comprised of a plurality of video frames. In some embodiments, the video stream 312 may correspond to an ABR video.

At a fifth time $T_5$ and as represented by block 314, in some embodiments, the first device 110 prepares the video stream 312 to transmit video frames 316 to the display device 150. For example, with reference to FIG. 2, the video stream preparation system 230 prepares the video stream 312. Preparing the video stream 312 may include locally buffering the video stream 312, in order to enable smoother video display at the display device 150.

Playing the video stream also includes, at a sixth time $T_6$, transmitting the video frames 316 to the display device 150.

Figure 4:
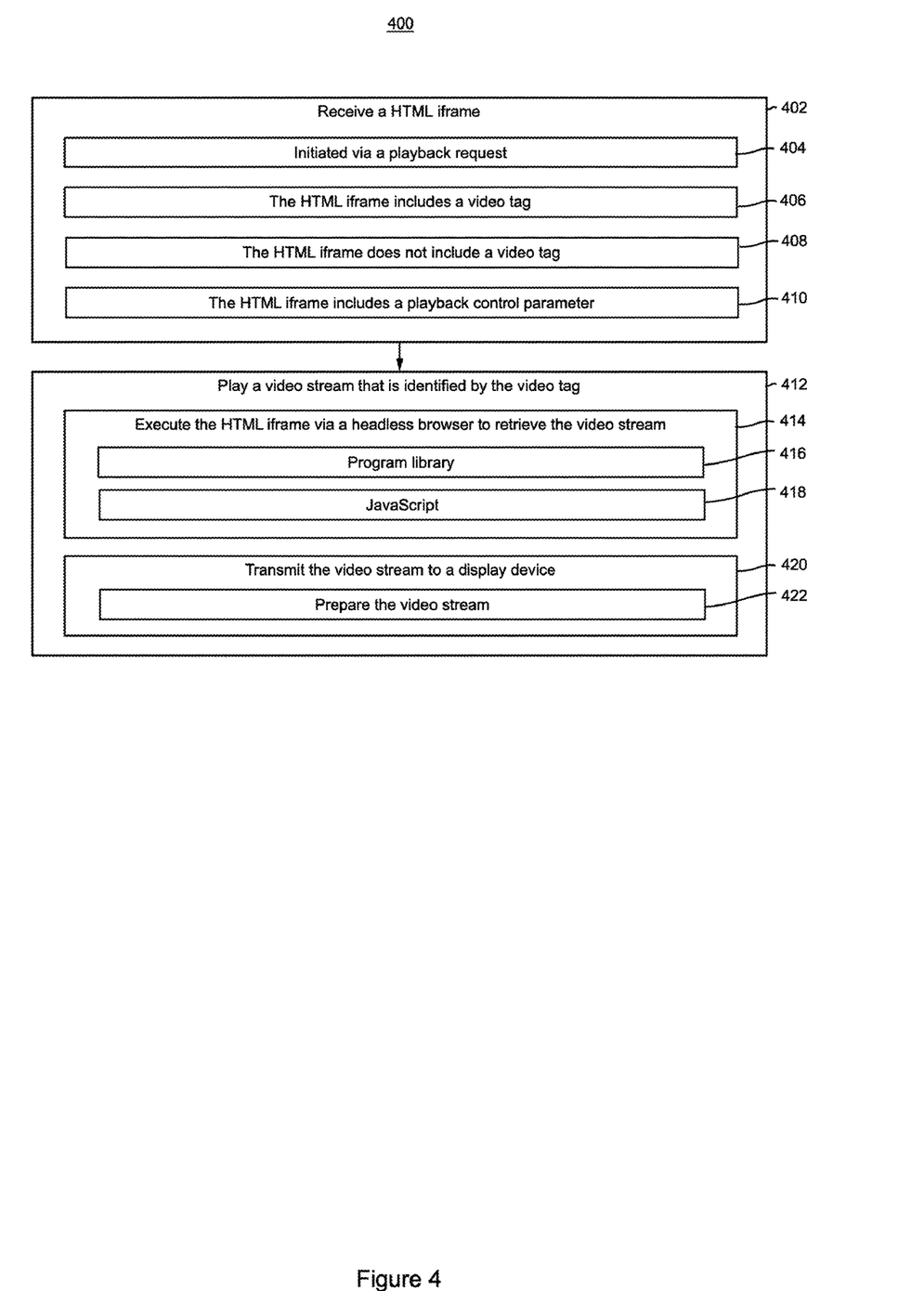
FIG. 4 is an example of a flow diagram of a method of facilitating video playback in accordance with some embodiments.

FIG. 4 is an example of a flow diagram of a method 400 of facilitating video playback in accordance with some embodiments. In some embodiments, the method 400 or portions thereof is performed by at a first device including a processor, a non-transitory memory, and a communication interface, such as the first device 110 described with reference to FIGS. 1-3. In some embodiments, the method 400 or portions thereof is performed by a controller that is integrated in a device. In some embodiments, the method 400 or portions thereof is performed by an apparatus with a processor, a non-transitory memory, and a communication interface. In some embodiments, the method 400 or portions thereof is performed by a system with a processor, a non-transitory memory, and a communication interface.

As represented by block 402, the method 400 includes receiving, via the communication interface, an HTML from a second device. The HTML iframe is associated with a video tag, which identifies a video stream. For example, the video tag is a playable URL of a video stream. As another example, the video tag corresponds to an HTML video tag. In the context of remote video playback (e.g., casting), the first device may be referred to as a receiving device, and the second device may be referred to as a sending device.

As represented by block 404, in some embodiments, sending the HTML iframe is initiated via a playback request. For example, with reference to FIG. 1, the second device 120 receives the playback request 127 from the user of the second device 120. As one example, the playback request 127 corresponds to a user selection of a thumbnail preview of a video, which is displayed on the display 126. As another example, the playback request 127 corresponds to a user selection of a remote video playback affordance displayed on the display 126. Selection of the remote video playback affordance triggers the second device 120 to begin transmitting a currently selected video. Accordingly, in some embodiments, the user of the second device 120 selects a video to be remotely played, and subsequently selects the remote video playback affordance to trigger the transmitting the video to the first device 110.

As represented by block 406, in some embodiments, the HTML iframe includes the video tag. For example, a portion of the text of the HTML iframe corresponds to a playable URL that identifies the video stream to be played.

As represented by block 408, in some embodiments, the HTML iframe does not include the video tag. For example, the HTML iframe includes a URL indicator that indicates another HTML iframe, which itself includes the video tag. As another example, the video tag is nested within the HTML iframe. One of ordinary skill in the art will appreciate that the video tag may be nested under any number of layers of the HTML iframe.

As represented by block 410, in some embodiments, the HTML iframe includes a playback control parameter that is different from the video tag. The playback control parameter may define how playback of the video stream should proceed. For example, the playback control parameter includes one or more of an advertisement content indicator, a digital rights management (DRM) indicator, a video appearance indicator, etc. The advertisement content indicator may indicate information regarding an advertisement to be played before or during playback of the video stream. The DRM indicator may indicate copyright or other legal information relating to playback of the video stream. The video appearance indicator may indicate an appropriate size or appropriate resolution for playback of the video stream.

As represented by block 412, the method 400 includes playing the video stream that is identified by the video tag. For example, in some embodiments, the first device performing the method 400 includes a video player application. As one example, with reference to FIG. 2, the video player application implements the headless browser 220 and optionally implements the video stream preparation system 230.

As represented by block 414, playing the video stream includes executing the HTML iframe via a headless browser, in order to retrieve the video stream based on the video tag. For example, with reference to FIG. 2, the headless browser 220 of the first device 110 executes the HTML iframe 128, in order to retrieve the video stream 142. To that end, in some embodiments, executing the HTML iframe 128 includes sending the video request 216 to the video content server 140. The video request 216 may include the video tag. In response to sending the video request 216, the first device 110 receives the video stream 142 from the video content server 140.

A headless browser may be characterized as a browser without a graphical user interface. Accordingly, in various embodiments, the first device need not perform a graphical operation (e.g., rendering or driving a display) in order to facilitate video playback. For example, with reference to FIG. 1, the first device 110 includes a lightweight CPU 112 that runs the headless browser, but the lightweight CPU 112 does not have the processing capacity to perform a graphical operation, or is not configured to perform the graphical operation.

In some embodiments, the headless browser does not use a predefined receiver application in order to retrieve the video stream. One example of a predefined receiver application is a video playback API. Not using a predefined receiver application is in contrast to other remote video playback systems, in which a sending device and a receiving device coordinate with each other via a predefined sending application (e.g., sender API(s)) and a predefined receiving application (e.g., receiver API(s)), respectively. Accordingly, video playback via the various embodiments disclosed herein is not constrained by the predefined applications.

As represented by block 416, in some embodiments, executing the HTML iframe includes executing a program library of a programming language. For example, the program library includes functionality for executing the HTML iframe. As one example, with reference to FIG. 2, the headless browser 220 uses the program library 222 in order to execute the HTML iframe 128.

As represented by block 418, in some embodiments, executing the HTML iframe includes executing JavaScript of the HTML iframe. For example, the HTML iframe includes JavaScript code (e.g., a JavaScript function), and executing the JavaScript executes the JavaScript code in order to perform the JavaScript Function.

As represented by block 420, playing the video stream includes transmitting the video stream to a display device. For example, with reference to FIG. 1, the first device 110 transmits the video stream 142 to the display device 150 for display via the display device 150. The display device may be separate from the first device (as illustrated in FIGS. 1 and 2), or the display device may be collocated with the first device. For example, the display device and the first device are collocated within a television. In some embodiments, the video stream is provided according to an ABR protocol, such as Dynamic Adaptive Streaming over HTTP (DASH) or HTTP Live Streaming (HLS). In some embodiments, the video stream corresponds to Moving Picture Experts Group (MPEG) video, such as MPEG-4 (.mp4).

As represented by block 422, in some embodiments, transmitting the video stream includes preparing the video stream for transmission. For example, in some embodiments, preparing the video stream includes buffering the video stream in the non-transitory memory, and providing the video stream from the non-transitory memory to the display device. With reference to FIG. 1, the first device 110 may buffer the video stream 142 in the non-transitory memory 114. With reference to FIG. 2, the first device 110 may buffer the video stream 142 via the video buffering subsystem 232. Buffering enables smoother display of the video stream at the display device.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be collocated or not collocated. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at a first device including a processor, a non-transitory memory, and a communication interface:
      receiving, via the communication interface, a HyperText Markup Language (HTML) inline frame (iframe) from a second device, wherein the HTML iframe is associated with a video tag; and
      playing a video stream that is identified by the video tag, wherein playing the video stream includes:
         executing the HTML iframe via a headless browser, in order to retrieve the video stream based on the video tag, wherein the headless browser does not use a predefined receiver application in order to retrieve the video stream, and
         transmitting the video stream to a display device.

2. The method of claim 1, wherein the HTML iframe includes the video tag.

3. The method of claim 1, wherein the HTML iframe does not include the video tag.

4. The method of claim 3, wherein the HTML iframe includes a uniform resource locator (URL) indicator that indicates another HTML iframe, and wherein the other HTML iframe includes the video tag.

5. The method of claim 3, wherein the video tag is nested within the HTML iframe.

6. The method of claim 1, wherein the HTML iframe includes a playback control parameter that is different from the video tag.

7. The method of claim 6, wherein the playback control parameter includes one or more of an advertisement content indicator, a digital rights management (DRM) indicator, or a video appearance indicator.

8. The method of claim 1, wherein executing the HTML iframe includes executing JavaScript of the HTML iframe.

9. The method of claim 1, wherein executing the HTML iframe includes executing one or more program libraries.

10. The method of claim 1, wherein the second device corresponds to a video playback control device.

11. The method of claim 1, wherein playing the video stream includes:
    buffering the video stream in the non-transitory memory; and
    providing the video stream from the non-transitory memory to the display device.

12. The method of claim 1, wherein transmitting the video stream includes transmitting video frames of the video stream to the second device.

13. The method of claim 1, further comprising:
    receiving user interface (UI) content from the second device; and
    transmitting the UI content to the display device.

14. The method of claim 1, wherein receiving the HTML iframe is in response to the second device receiving a playback request.

15. The method of claim 14, wherein the playback request requests remote video playback.

16. A first device comprising:
    a processor;
    a communication interface; and
    a non-transitory memory storing computer-readable instructions, which when executed by the processor, cause the first device to:
       receive, via the communication interface, an HTML iframe from a second device, wherein the HTML iframe is associated with a video tag; and
       play a video stream that is identified by the video tag, wherein playing the video stream includes:
          execution of the HTML iframe via a headless browser, in order to retrieve the video stream based on the video tag, wherein the headless browser does not use a predefined receiver application in order to retrieve the video steam, and
          transmission of the video stream to a display device.

17. The first device of claim 16, wherein the video tag is nested within the HTML iframe.

18. The first device of claim 16, wherein executing the HTML iframe includes executing JavaScript of the HTML iframe or executing one or more program libraries.

19. A non-transitory computer-readable medium that includes computer-readable instructions stored thereon that are executable by a processor of a first device to perform operations comprising:
    receiving, via a communication interface, an HTML iframe from a second device, wherein the HTML iframe is associated with a video tag; and
    playing a video stream that is identified by the video tag, wherein playing the video stream includes:

executing the HTML iframe via a headless browser, in order to retrieve the video stream based on the video tag, wherein the headless browser does not use a predefined receiver application in order to retrieve the video stream, and transmitting the video stream to a display device.

20. The method of claim 1, wherein the headless browser does not include a graphical user interface.

* * * * *